Patented Aug. 8, 1944

2,355,081

UNITED STATES PATENT OFFICE 2,355,081

PREPARATION OF A PHOSPHATIDE COMPOSITION

Percy L. Julian, Maywood, and Edwin W. Meyer, Evanston, Ill., assignors to The Glidden Company, Cleveland, Ohio, a corporation of Ohio No Drawing. Application July 25, 1941, Serial No. 403,992

20 Claims. (Cl. 252—1)

The present invention relates to phosphatides and particularly relates to a process for modifying some of the properties of phosphatides and mixtures containing phosphatides, and to the products produced thereby.

Phosphatides as commercially prepared from soybeans, corn oil, cottonseed oil, etc., are usually prepared containing some fat or oil in a minor proportion as a carrier for the phosphatides. The pure phosphatides have poor stability and the oil or fat acts as a stabilizer. The oils may either be the oils from which the phosphatide was obtained or may be some other oil or fat such as cocoa butter. Soybean phosphatides as commercially prepared from the emulsion obtained by treating the oil with steam or water usually contain 55–65% phosphatides and about 35–45% oil. So called "cocoa butter lecithin" as commercially prepared usually contains around 20% cocoa butter.

The phosphatide-oil mixtures prepared are often of a solid or heavy consistency and frequently vary in consistency. Since the phosphatide mixtures are used almost exclusively in small amounts, in admixture with liquids and solids in which uses its effectiveness is dependent, to a considerable extent, upon a uniform incorporation, it is very desirable that a fluid material of uniform consistency be employed.

Also there are numerous uses of phosphatides, which are emulsifying agents, in which the emulsifying property is undesirable. Among these uses may be mentioned the use in lubricating oil as a varnish inhibitor.

It is accordingly an object of this invention to provide a process for treating phosphatide and oil mixtures to control the viscosity.

A further object of this invention is to provide a process for treating phosphatides to destroy or lessen their emulsifying properties.

Other objects will appear from the following description of the invention.

In our copending application, Serial No. 403,990 filed July 25, 1941, there has been disclosed the addition of water soluble acids to aqueous emulsions of phosphatide-oil mixtures to reduce the pH value of the phosphatides. As disclosed in the above mentioned application, this reduction in the pH value results in a lower viscosity of the phosphatide oil mixture due to increased oil solubility of the phosphatide and also a reduction in the emulsifying property of the phosphatide upon the addition of proper amounts of the acid.

In the drawing of such emulsions, however, there is liable to be hydrolysis of the phosphatide and/or oil and production of dark colored bodies if proper precautions are not taken in the drying to prevent their formation.

It has been found that commercially concentrated phosphoric acid (80–85%) as well as glycerol phosphoric acid may be added to the dried phosphatide-oil mixture with the resultant lowering of the viscosity and reduction in the emulsifying properties while at the same time overcoming the tendency to hydrolysis and the formation of color base.

It is important that the acid material be uniformly distributed or dispersed throughout the mass and it has been found that the acid material should either be soluble in the oil or at least dispersible therein. In the case of glycerol phosphoric acid it appears to be soluble in glyceride oil. The concentrated phosphoric acid appears to be at least dispersible in the glyceride oil but applicants do not wish to be bound by any theory as to whether or not this is a true solubility phenomenon. In any event the concentrated phosphoric acid and glycerol phosphoric acid are readily dispersible in the oil and when dispersed produce the desired lowering of the pH value of the mixture.

Compounds like phosphatides, of the lecithin variety, are "Zwitter ions" and have long been recognized as good emulsifying agents since they contain a large oil soluble residue in the molecule as well as water soluble groupings. Thus the amino groups and the phosphoric acid groups have a tendency to be attracted to water, while the fatty acid portions tend to be attracted to the oil. By treating the phosphatide with acids the charges upon the "Zwitter ions" which tend to cause water solubility are neutralized with a resulting decrease in water solubility and increase in oil solubility. Since the effect of the water attracting group has been nullified or minimized the tendency to emulsification is decreased.

As a consequence of the increased oil solubility of the phosphatide, the viscosity of the oil solution is decreased. Simultaneously, therefore, with the decreasing of the emulsifying properties a mixture of phosphatide and oil is more nearly a true solution than would be the case with the untreated phosphatide, thus such a mixture would be of softer consistency.

It is important, however, that the acid be uniformly distributed throughout the phosphatide mass. The amount of acid added will depend somewhat upon the particular composition of the phosphatide-oil mixture, upon the particular acid used, upon the particular viscosity desired, and upon the desired emulsifying properties. For the reduction of fluidity increasing the amounts up to a certain point appears to produce increasingly lowered viscosity. The change in emulsifying properties appears to be dependent upon the nature of the charge or charges upon the phosphatide molecule. Thus while rather small amounts produce desired viscosities a substantial reduction in emulsifying power does not occur upon the addition of the smaller quantities but appears to take place only upon the addition of a sufficient amount of acid to produce the proper reduction of the pH value of the mixture. pH values determined on the water layer formed by emulsifying lubricating oil with water and employing the acid treated phosphatide-glyceride oil mixture indicate that the pH value at which substantial reduction in emulsifying begins generally lies in the range of pH 3.7 to 4.3 or approximately 4. Applicants, however, do not wish to be understood as meaning that the pH value of the water layer is necessarily or always a true indication of the pH value of the dry mixture itself or of the true condition of the charges upon the phosphatide molecule. The pH value obtained in the water layer may depend to some extent upon the amount of the particular acid dissolved in the water. However, the dry phosphatide-oil mixture is of a lipophillic nature and consequently the pH of an aqueous solution of an acid may not necessarily represent the true condition of the charges upon the phosphatide molecule. The decrease in the emulsifying properties, however, does occur rather sharply and may be readily determined. While the emulsifying properties do not substantially decrease until this critical point is reached more acid may be added if desired and still produce the lowered viscosity and decreased emulsifying properties.

The acid may be incorporated into the dry phosphatide-oil mixture in any manner but it is preferred to mix the acid into the molten or fluid mass of the phosphatide-oil mixture.

EXAMPLE 1

Aliquot parts of a commercial soybean phosphatide-oil mixture were heated to a temperature of about 70° C. and varying amounts of glycerol phosphoric acid added to the mixture with agitation and heating for 20 to 30 minutes until the dispersion of the glycerol phosphoric acid was completed and the viscosity had been reduced. The emulsifying properties of these mixtures were then determined by the Navy emulsion test, which is United States Government Test 320.12, as follows:

40 ml. of water and 40 ml. of lubricating oil containing 0.1% by weight of the lubricating oil of the phosphatide-oil-acid mixture were added to a graduated cylinder. The cylinder was immersed in a heating liquid and a temperature of 180° F. was maintained during the tests. The mixtures were agitated for five minutes and allowed to stand at the test temperature for specified times. The mixtures separated into three layers, an oil layer, a water layer and an emulsion layer. The number of ml. in the emulsion layers and the pH of the water layers were observed. A blank was also run applying the crude untreated phosphatide-oil mixture. The results are shown in Table I.

TABLE I

*0.1% phosphatide-oil-glycerol phosphoric acid mixture used in emulsification tests*

| Percent glycerol phosphoric acid used in phosphatide oil mixture | Ml. of emulsion | | | | pH of water layer |
|---|---|---|---|---|---|
| | 15 min. | 30 min. | 45 min. | 60 min. | |
| None (crude phosphatide) | 49.0 | 46.0 | 46.0 | 44.0 | 6.0 |
| 2.5% | 8.0 | 4.0 | 4.0 | 2.5 | 4.81 |
| 5.0% | 2.5 | 2.5 | 2.0 | 2.0 | 4.31 |
| 20.0% | 8.5 | 5.0 | 4.0 | 3.5 | 3.9 |

EXAMPLE 2

In this example 5% of commercial 85% concentrated phosphoric acid was incorporated with a commercially prepared soybean phosphatide-oil mixture in the same manner as described in Example 1. Emulsification tests, as in Example 1, were then made employing varying amounts of this phosphatide-oil-phosphoric acid mixture, the amount of the emulsion formed and the pH of the water layer being noted. The results are shown in Table II.

TABLE II

*5% of 85% phosphoric acid in phosphatide-oil mixture*

| Percent phosphatide oil acid mixture used in emulsification | Ml. of emulsion | | | | pH of water layer |
|---|---|---|---|---|---|
| | 15 min. | 30 min. | 45 min. | 60 min. | |
| 0.1 | 3.0 | 2.0 | 1.5 | 1.0 | 4.02 |
| 0.2 | 5.0 | 4.0 | 4.0 | 4.0 | 3.92 |
| 0.3 | 7.0 | 6.5 | 6.0 | 5.0 | 3.75 |
| Crude phosphatide | 49.0 | 46.0 | 46.0 | 44.0 | 6.0 |

The compositions produced by the present invention have numerous uses for both technical and edible purposes. Where phosphatides are used for their antioxidant or similar properties and the emulsifying property is undesirable the compositions of the present invention are particularly suitable. There are also numerous uses for phosphatides in edible products and pharmaceutical products and when so used the compositions of the present invention containing glycerol phosphoric acid are particularly suitable.

It is not to be understood from the foregoing description that a mixture of oil and phosphatide must in all cases be treated or that the composition produced necessarily in all cases contains oil. Phosphatides alone may be treated or the oil may be removed from a treated oil-phosphatide mixture. In such cases the treated phosphatide will show lowered viscosity in oil solutions and where sufficient acidic substance is used will have decreased emulsifying power. Oil-phosphatide mixtures, however, are preferred.

Having described the invention what is claimed is:

1. In the preparation of a phosphatide composition the step comprising mixing a dry vegetable phosphatide-glyceride oil composition with a small amount of an acid selected from the class consisting of concentrated phosphoric acid and glycerol phosphoric acid to thoroughly incorporate the acid throughout the mass in an amount sufficient to increase the solubility of the phosphatide in the oil.

2. The method of claim 1 in which the amount of acid is sufficient to materially reduce the emulsifying property of the phosphatide.

3. In the preparation of a phosphatide composition the step comprising mixing a dry, molten, vegetable phosphatide-glyceride oil composition with a small amount of an acid selected from the class consisting of concentrated phosphoric acid and glycerol phosphoric acid to thoroughly incorporate the acid throughout the mass in an amount sufficient to increase the solubility of the phosphatide in the oil.

4. The method of claim 3 in which the amount of the acid is sufficient to materially reduce the emulsifying property of the phosphatide.

5. In the preparation of a phosphatide composition the step comprising mixing a dry, molten, vegetable phosphatide-glyceride oil composition with a small amount of glycerol phosphoric acid to thoroughly incorporate the acid throughout the mass in an amount sufficient to increase the solubility of the phosphatide in the oil.

6. The method of claim 5 in which the amount of acid is sufficient to materially reduce the emulsifying property of the phosphatide.

7. In the preparation of a phosphatide composition the step comprising mixing a dry, molten, vegetable phosphatide-glyceride oil composition with a small amount of concentrated phosphoric acid in an amount sufficient to increase the solubility of the phosphatide in the oil.

8. The method of claim 7 in which the amount of acid is sufficient to materially reduce the emulsifying property of the phosphatide.

9. In the preparation of a phosphatide composition the step comprising mixing a dry, molten soybean phosphatide-glyceride oil composition with a small amount of an acid selected from the class consisting of concentrated phosphoric acid and glycerol phosphoric acid to thoroughly incorporate the acid throughout the mass in an amount sufficient to increase the solubility of the phosphatide in the oil.

10. The method of claim 9 in which the amount of acid is sufficient to materially reduce the emulsifying property of the phosphatide.

11. In the preparation of a phosphatide composition the step which comprises mixing a dry vegetable phosphatide composition with a small amount of an acid selected from the class consisting of concentrated phosphoric acid and glycerol phosphoric acid to thoroughly incorporate the acid throughout the mass in an amount sufficient to increase the oil solubility of the phosphatide.

12. The method of claim 11 in which the amount of acid is sufficient to materially reduce the emulsifying property of the phosphatide.

13. In the preparation of a phosphatide composition the step comprising mixing a dry, molten, vegetable phosphatide composition with a small amount of an acid selected from the class consisting of concentrated phosphoric acid and glycerol phosphoric acid to thoroughly incorporate the acid throughout the mass in an amount sufficient to increase the oil solubility of the phosphatide.

14. The method of claim 13 in which the amount of the acid is sufficient to materially reduce the emulsifying property of the phosphatide.

15. In the preparation of a phosphatide composition the step comprising mixing a dry, molten, vegetable phosphatide composition with a small amount of glycerol phosphoric acid to thoroughly incorporate the acid throughout the mass in an amount sufficient to increase the oil solubility of the phosphatide.

16. The method of claim 15 in which the amount of acid is sufficient to materially reduce the emulsifying property of the phosphatide.

17. In the preparation of a phosphatide composition the step comprising mixing a dry, molten, vegetable phosphatide composition with a small amount of concentrated phosphoric acid in an amount sufficient to increase the oil solubility of the phosphatide.

18. The method of claim 17 in which the amount of acid is sufficient to materially reduce the emulsifying property of the phosphatide.

19. In the preparation of a phosphatide composition the step comprising mixing a dry, molten soybean phosphatide composition with a small amount of an acid selected from the class consisting of concentrated phosphoric acid and glycerol phosphoric acid to thoroughly incorporate the acid throughout the mass in an amount sufficient to increase the oil solubility of the phosphatide.

20. The method of claim 19 in which the amount of acid is sufficient to materially reduce the emulsifying property of the phosphatide.

PERCY L. JULIAN.
EDWIN W. MEYER.